United States Patent [19]

Perkins

[11] Patent Number: 5,553,133
[45] Date of Patent: Sep. 3, 1996

[54] SYSTEM AND METHOD FOR PREDICTIVE OUTDIALING

[75] Inventor: Mark M. Perkins, Cupertino, Calif.

[73] Assignee: Siemens Rolm Communications, Inc., Santa Clara, Calif.

[21] Appl. No.: 268,470

[22] Filed: Jun. 30, 1994

[51] Int. Cl.⁶ .................................................. H04Q 3/64
[52] U.S. Cl. ...................... 379/265; 379/266; 379/309; 379/92; 379/216; 379/112
[58] Field of Search ................................. 379/265, 266, 379/216, 309, 201, 92, 112

[56] References Cited

U.S. PATENT DOCUMENTS

| | | | |
|---|---|---|---|
| 4,800,583 | 1/1989 | Theis | 379/266 |
| 4,829,563 | 5/1989 | Crockett et al. | 379/216 |
| 4,933,964 | 6/1990 | Girgis | 379/216 |
| 5,020,095 | 5/1991 | Morganstein et al. | 379/266 |
| 5,164,983 | 11/1992 | Brown et al. | 379/265 |
| 5,295,184 | 3/1994 | Smith et al. | 379/216 |
| 5,327,490 | 7/1994 | Cave | 379/266 |
| 5,327,491 | 7/1994 | Syu | 379/216 |
| 5,341,412 | 8/1994 | Ramot et al. | 379/216 |

*Primary Examiner*—Jeffery Hofsass
*Assistant Examiner*—Scott Wolinsky

[57] ABSTRACT

System and method for outdialing telephone calls on a basis which takes into account the availability of agents who are assigned to process telephone calls placed. In accordance with the invention, telephone calls are placed ahead of the availability of agents so that the overall productivity of the agents is increased. The number of telephone calls that should be placed is determined in light of the actual measurements of system performance and in light of performance objectives. The determinations are dynamically refined based on measurements of actual agent and telephone call activity provided by the telephone system.

35 Claims, 8 Drawing Sheets

SYSTEM AND METHOD FOR PREDICTIVE OUTDIALING

BACKGROUND OF THE INVENTION

1. Field of the Invention

The present invention relates to a system and method for resource optimization in an environment where certain aspects of the environment operate at different or less predictable speeds than other related aspects. More specifically, embodiments of the present invention contemplate a system and method for automatically initiating communications for a plurality of agents wishing to interact with target entities (e.g., automatically placing telephone calls to customers or potential customers). These embodiments further contemplate prediction of when agents will become available to interact with customers, and for initiating or disconnecting an initiated communication, accordingly.

2. Related Art

In one conventional application of telephone systems, people within an organization, called agents, place telephone calls to people outside the organization, typically customers or prospective customers. Printed lists of telephone numbers are provided to the agents. Each agent manually dials the telephone numbers on his or her list, waits for each telephone call to be answered, and then engages in a conversation with the person who answers the telephone call. The agent discontinues the process if the telephone call is not answered within a predetermined period of time, and the agent may retry the telephone call later. All the telephone numbers on the printed list are processed in this manner.

Many organizations have automated the above-described application by using computers to process the lists of telephone numbers and present them to individual agents. Each agent then manually dials the telephone numbers presented to them, waits for each telephone call to be answered, and then engages in a telephone conversation with the person who answers. The agent discontinues the process if the telephone call is not answered by a person within a predetermined period; the computer may instruct the agent to retry the call later.

The manual dialing procedures described above, whether using printed lists or telephone call scheduling by a computer, are inefficient because the agents must manually dial each telephone call, and then wait for an answer for each telephone call or for a predetermined amount of time to pass before concluding that the telephone call should be discontinued because it was not answered. In addition, manual dialing of telephone numbers is subject to error. These errors and the delays incurred while dialing and waiting for telephone calls to be answered decrease the productivity and effectiveness of agents and increase the costs for such applications.

Modern telephone systems, such as a ROLM Computerized Branch Exchange (CBX) system manufactured by ROLM Systems of Santa Clara, Calif., provide methods by which a computer instructs the telephone system to dial a telephone number for an agent. Depending on the specific capabilities of the telephone system, the telephone system also can determine that a call was not answered within a predetermined period and can disconnect the telephone call. Whenever the telephone system determines that a telephone call is answered, it connects the telephone call to an available agent; this connection can usually be made rapidly enough so that the called party is not aware that a computer, not an agent, has directed the telephone call. Such telephone systems reduce the amount of time that an agent must devote to dialing a telephone call and, hence, eliminate errors associated with manual dialing.

To ensure that an agent is available at the moment a telephone call is answered, many presently available telephone systems and computers place telephone calls only when they are certain that at least one agent is available to answer each such telephone call. This process, known as "preview dialing," is inefficient because an agent must wait from the time the computer begins to dial a telephone call until the time that the remote telephone is answered. Telephone calls may not be answered immediately, and many telephone calls remain unanswered. As one will readily appreciate, agent waiting time increases when the time to answer telephone calls increases and as the ratio of unanswered telephone calls to placed telephone calls increases. The time agents spend waiting adds to the labor costs for agents and thus decreases their productivity and effectiveness.

Because of the above-described problem concerning agent waiting time in telephony applications, there is a need for a system and method that places telephone calls without requiring agents to wait until the telephone calls are answered.

SUMMARY OF THE INVENTION

The present invention advantageously satisfies the above-identified need by providing a system and method for initiating communications with target entities at a rate such that agents' time can be utilized efficiently. More specifically, the present invention predicts the minimum and the maximum number of communications that should be initiated, based upon such factors as the total number of agents and the number of placed communications that are likely to be answered. Thus, predictions concerning when to initiate additional communications or disconnect ones that have already been placed can be made, adjusted and implemented dynamically. Consequently, in accordance with the present invention, communications are able to be placed ahead of the availability of the agents.

In various embodiments of the present invention, the telephone is used as the means of communication between the agents and the target entities. The present invention initiates or disconnects calls at a rate commensurate with various factors such that calls can be initiated (e.g., numbers dialed) even though an agent may not be available at the moment of initiation. When a call is answered by the person at the other end of the line, an agent is then connected with the answering person.

BRIEF DESCRIPTION OF THE DRAWINGS

A complete understanding of the present invention may be gained by considering the following detailed description together with the accompanying drawings, in which.

DETAILED DESCRIPTION

The present invention relates to a system and method for resource optimization in an environment where certain aspects of the environment operate at different or less predictable speeds than other related aspects. More specifically, embodiments of the present invention contemplate a system and method for automatically initiating communications for a plurality of agents wishing to interact with target entities (e.g., automatically placing telephone calls to customers or potential customers). These embodiments further contemplate prediction of when agents will become available to interact with customers, and for initiating or disconnecting an initiated communication, accordingly.

Figure 1:
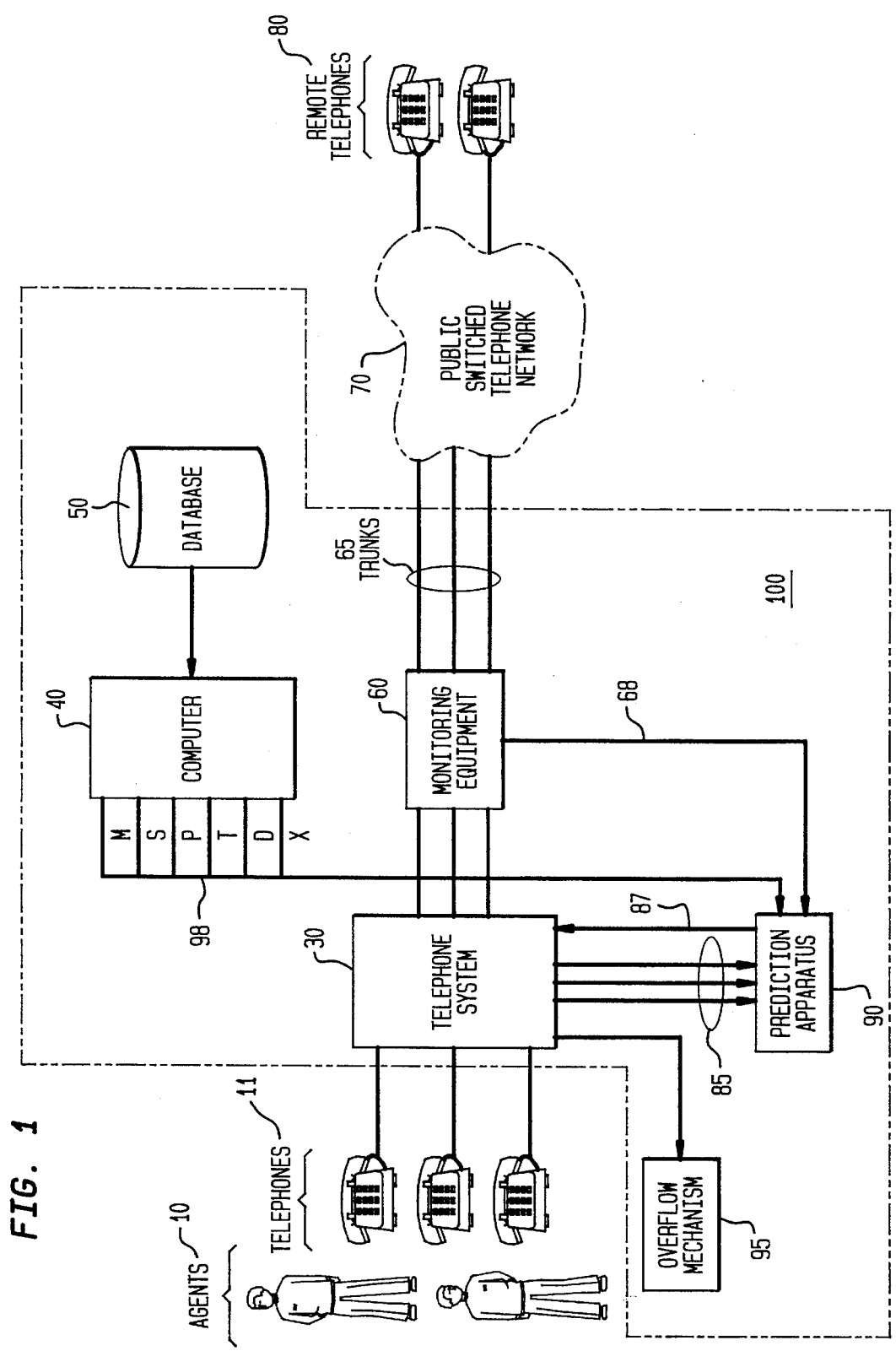
FIG. 1 shows a block diagram of an embodiment of a predictive outdialing system contemplated by embodiments of the present invention.

FIG. 1 shows a block diagram of a predictive outdialing system 100 as contemplated by embodiments of the present invention. Predictive outdialing apparatus 100 places outbound calls, for example, telemarketing calls, on behalf of agents 10. In accordance with the present invention, predictive outdialing apparatus 100 balances the need to place many telephone calls to keep agents 10 busy against the need to have an agent from among agents 10 available to handle a call whenever it is answered by a customer at one of remote telephones 80.

In various embodiments contemplated by the present invention, a computer 40, a database 50, a telephone system 30, and a monitoring system 60, places calls, determine when the calls are answered, and connect the calls to available agents. Prediction apparatus 90 provides input to telephone system 30 which is used by telephone system 30 to pace placing and disconnecting calls as a function of the system activities.

Referring now to FIG. 1, database 50 comprises telephone numbers which are to be outdialed. Computer 40 is programmed to obtain telephone numbers from database 50 in accordance with a predetermined schedule and to transfer the telephone numbers to a telephone system 30 (via a prediction apparatus 90). Telephone system 30 then causes the telephone numbers to be dialed in a manner described below. In various embodiments contemplated by the present invention, the telephone system 30 and associated components can be a ROLM CBX 9751. Of course, any number of other systems can also be used, and the components mentioned above can be separate or combined into one integrated unit.

A telephone call placed by telephone system 30, i.e., outdialed, is routed over one of trunks 65 to a telephone network 70. As shown in FIG. 1, telephone network 70 is a public switched network. Telephone network 70 routes the telephone call to one of remote telephones 80. Telephone network 70 then reports the status of the telephone call placed over one of the trunks 65. Monitoring equipment 60 monitors the status of telephone calls on trunks 65 and transmits data in the form of parameters 68 (representing the status of the telephone calls) to prediction apparatus 90. Parameters 68 are utilized in the manner to be described in detail below to determine whether a telephone call has been answered.

The present invention contemplates that monitoring equipment 60 can be any number of devices, such as a computer based upon an Intel 80X86 microprocessor or a microprocessor sold under the federally registered trademark PENTIUM by the Intel Corporation of Santa Clara, Calif., in conjunction with a D/41 card and Voice Driver software from Dialogic Corporation of Parsippany, N.J. However, it should be understood that embodiments of the present invention are not limited to these components and, e.g., other processors and microprocessors can be used, such as those manufactured by Motorola of Schaumburg, Ill., and Digital Equipment of Maynard, Mass. In addition, the embodiments are not limited to separate telephone systems and monitoring equipment. For example, telephone system 30 and monitoring equipment 60 can be combined into a single apparatus.

In addition to dialing telephone numbers and receiving parameters 68, embodiments of the present invention contemplate that telephone system 30 also functions to: (a) connect telephones 11 to trunks 65 to provide a telephone connection between remote telephones 80 and telephones 11; (b) determine the status of telephones 11, i.e., is it off-hook to designate that an agent is using the telephone or is it on-hook to designate that no agent is using the telephone; (c) provide parameters 85, representing the status of telephone calls and the status of agents 10 at telephones 11, to a prediction apparatus 90; (d) receive parameters 87 from prediction apparatus 90 for use in placing calls. Many of these functions will be described in greater detail below.

Concerning prediction apparatus 90, parameters 85 are received as input and various calculations are performed to determine whether additional telephone calls should be placed or whether already-placed telephone calls should be disconnected before being answered by the called parties. Prediction apparatus 90 outputs parameters 87 to telephone system 30, which uses the received output parameters 87 to place an appropriate number of additional telephone calls or to disconnect excess telephone calls before they are answered. Thus, prediction apparatus 90 functions to: (a) maintain a count of already-placed telephone calls which have not yet been answered; and (b) determine the number of additional telephone calls to place and the number of already-placed telephone calls that have not been answered and that should be disconnected before they are answered.

It should be understood that embodiments of the present invention are not limited to apparatus comprising separate telephone systems and predictive dialing apparatus. For example, prediction apparatus 90 and telephone system 30 can be combined into a single apparatus. Furthermore, prediction apparatus 90 may be implemented on any of a multiplicity of computer processors, such as one based on an Intel 80X86 or PENTIUM microprocessor, allowing it to be capable of communicating parameters to and receiving parameters from telephone system 30.

In operation, whenever telephone system 30 receives input from monitoring equipment 60 (via prediction apparatus 90) which enables it to determine that a telephone call is answered, telephone system 30 routes the telephone call to one of a group of available agents 10 at telephones 11. If telephone system 30 determines that no agent is available to handle the telephone call, telephone system 30 will route the telephone call to an overflow mechanism 95. The overflow mechanism 95 could: (1) disconnect the answered telephone call, (2) divert the answered telephone call to a recording device in an attempt to keep the answering party on the line long enough to allow connection of the call to a subsequently free agent, or (3) route calls to another group of agents. Of course, it should be understood that the present invention contemplates the use of any number of different types of overflow mechanisms. Overflow mechanisms, such as those mentioned above, are generally known, and a person of ordinary skill in the relevant arts will readily understand the implementation details of an overflow handler. As such, further discussion of overflow mechanisms will not be provided.

When one of agents 10 disconnects from a telephone call, telephone system 30 detects the event and determines that the agent is now available to handle another telephone call. Telephone system 30 keeps track of the number of available agents and provides that number as one of parameters 85 to prediction apparatus 90.

Prediction apparatus 90 makes its determinations as mentioned above by analyzing such factors as the number of telephone calls that have been placed, the number of available agents and determining when an agent is likely to be free (i.e., available). In performing the analysis, prediction apparatus 90 utilizes a policy vector $p(n)$ to determine whether additional telephone calls should be placed and a policy vector $q(n)$ to determine whether already-placed telephone calls which have not yet been answered should be disconnected.

Prediction apparatus 90 utilizes three categories of information in providing its output parameters 87, the categories being static information, dynamic information, and auxiliary information. Embodiments of the present invention contemplate that the static information comprises: (a) average call duration, (b) the fraction of placed calls which are answered, (c) the average call setup time, (d) the number of agents in the group, and (e) the maximum allowed fraction of overflowed calls; the dynamic information comprises: (a) the number of agents who are free now and (b) the number of calls currently in the setup phase; and the auxiliary information comprises: (a) the type of overflow mechanism (e.g., when no agent is available to answer a call, the call can either be dropped, forwarded to another group of agents, or sent to a recording), (b) rate of disappearing agents (for various reasons, the idle agents may suddenly become unavailable to take outbound calls), (c) forced idle time (i.e., the group supervisor may put a minimum limit on the percentage of time each agent is idle in order to prevent the agents from becoming overworked, and (d) the fraction of monitoring channels which are functioning (i.e., when some of the equipment used to determine that a call is answered malfunctions, an agent may be connected to a dialed call immediately after dialing rather than waiting for the call to be answered). Thus, various embodiments of the present invention use this information to determine whether additional calls should be placed or whether calls in progress should be abandoned.

Prediction apparatus 90 develops a policy $(p(n),q(n))$ which, in effect, specifies the number of telephone calls which should be in a setup phase when n agents of the group of agents 10 are idle. The setup phase is the time period which begins when the call is initiated and which ends just before the call is either answered or otherwise disposed of because, for example, the line is busy. The policy $(p(n),q(n))$ can be interpreted as follows: when n agents of the group of agents 10 are idle, there should be at least $p(n)$ but no more than $q(n)$ calls in the setup state. Prediction apparatus 90 determines $p(n)$ and $q(n)$ and provides output to telephone system 30 to achieve the objective of outdialing apparatus 100 to keep agents as busy as possible while not placing calls which will be answered by customers when all of the agents are busy.

More specifically, prediction apparatus 90 functions such that if fewer than $p(n)$ calls are in the setup state, prediction apparatus 90 sends a message to telephone system 30 to cause it to initiate additional calls. However, if more than $p(n)$ calls are in the setup state, prediction apparatus 90 sends a message to telephone system 30 to cause it not to place additional calls. Lastly, if more than $q(n)$ calls are in the setup state, prediction apparatus 90 sends a message to telephone system 30 to cause it to disconnect calls already initiated (but not yet answered) until $q(n)$ calls are in the setup state.

The following describes in detail how prediction apparatus 90 determines the policy. In accordance with the present invention, the determination of the policy occurs in two phases, determining a basic policy and adjusting the basic policy.

In accordance with the present invention, the basic policy depends on the value of the five above-described static parameters, possibly adjusted to take into account the above-described auxiliary information. In accordance with embodiments of the present invention, the basic policy is determined when the outdialing system 100 is initialized or whenever there is a significant change to any of the five static parameters. For minor variations in these parameters, the basic policy can be merely adjusted. A significant change can be, for example, one that makes it difficult to compute a valid policy by simply adjusting the existing basic policy. Specifically, any change to the "maximum allowed fraction of overflowed calls," doubling or halving of the "fraction of placed calls which are answered" or a combination of changes in the other three parameters resulting in a doubling or halving of a' with respect to a, for any n, as calculated in action block 680 of FIG. 4, as discussed below.

During operation of outdialing system 100, there are several factors which may require additional adjustments to the policy. The level of adjustment is specified by the auxiliary parameters. The adjustment for each factor can either be a runtime adjustment to the basic policy or an adjustment to a parameter of the basic policy made before the basic policy is determined.

The following five of parameters 98 from computer 40 are hereinafter referred to collectively as "static parameters":

| | |
|---|---|
| c | the total number of agents among agents 10 who are either handling a telephone call or who are available to handle a telephone call; c does not include agents who are on a break from work |
| m | the rate at which an agent among agents 10 becomes free; thus 1/m is an average of a time period during which an agent handles a call. The time period begins when an agent is assigned to a telephone call and ends when the agent again becomes available to handle a new call; a typical value for 1/m may be 100 seconds |
| s | the rate at which placed telephone calls are either answered or disconnected because they are not | likely to be answered; thus 1/s is the average call setup time is an average of a time period which begins when a telephone call is placed and which ends when the call is answered or is disconnected because it is not likely to be answered --in practice, the average call setup time includes the average time for different call types, for example, calls which are answered, ring--no-answer ("RNA"), and busy. A typical value is 30 seconds, but this will generally depend on the fraction of calls which are answered since answered calls have a shorter setup time then RNA calls p     is the probability that a telephone call is answered and is computed as the number of answered calls divided by the number of calls which are placed, exclusive of calls which are not completed for non-customer-related reasons such as, for example, all-trunks busy r     the maximum allowed fraction of telephone calls that may be routed to overflow mechanism 95, i.e., the predetermined performance objective. The fraction of overflow is the number of overflowed calls divided by the number of answered calls. The maximum allowed fraction is a measure of how aggressively to dial calls.

c, m, s, p, and r are set up during initialization of the outdialing system 100, and adjusted by the auxiliary parameters.

The following four of parameters 98 from computer 40 are hereinafter referred to collectively as "auxiliary parameters":

x     the type of overflow mechanism 95 being used
t     the desired limit of average agent utilization to avoid overworking agents 10
d     the rate at which agents 10 become unavailable for telephone calls. For example, agents 10 may become unavailable because they receive telephone calls unrelated to telephone calls initiated by telephone system 30
f     the fraction of telephone trunks for which telephone system 30 cannot determine the answer status due to malfunctionaing telephone system equiptment.

x, t, d, and f are set up during initialization of outdialing apparatus 100.

The following two of parameters 85 and 68 are hereinafter referred to collectively as "dynamic parameters":

n     the number of agents 10 who are immediately available
k     the number of telephone calls that are currently being dialed or are dialed but not yet answered.

n and k are determined by the telephone system 30 and the monitoring equipment 60, respectively.

Figure 2:
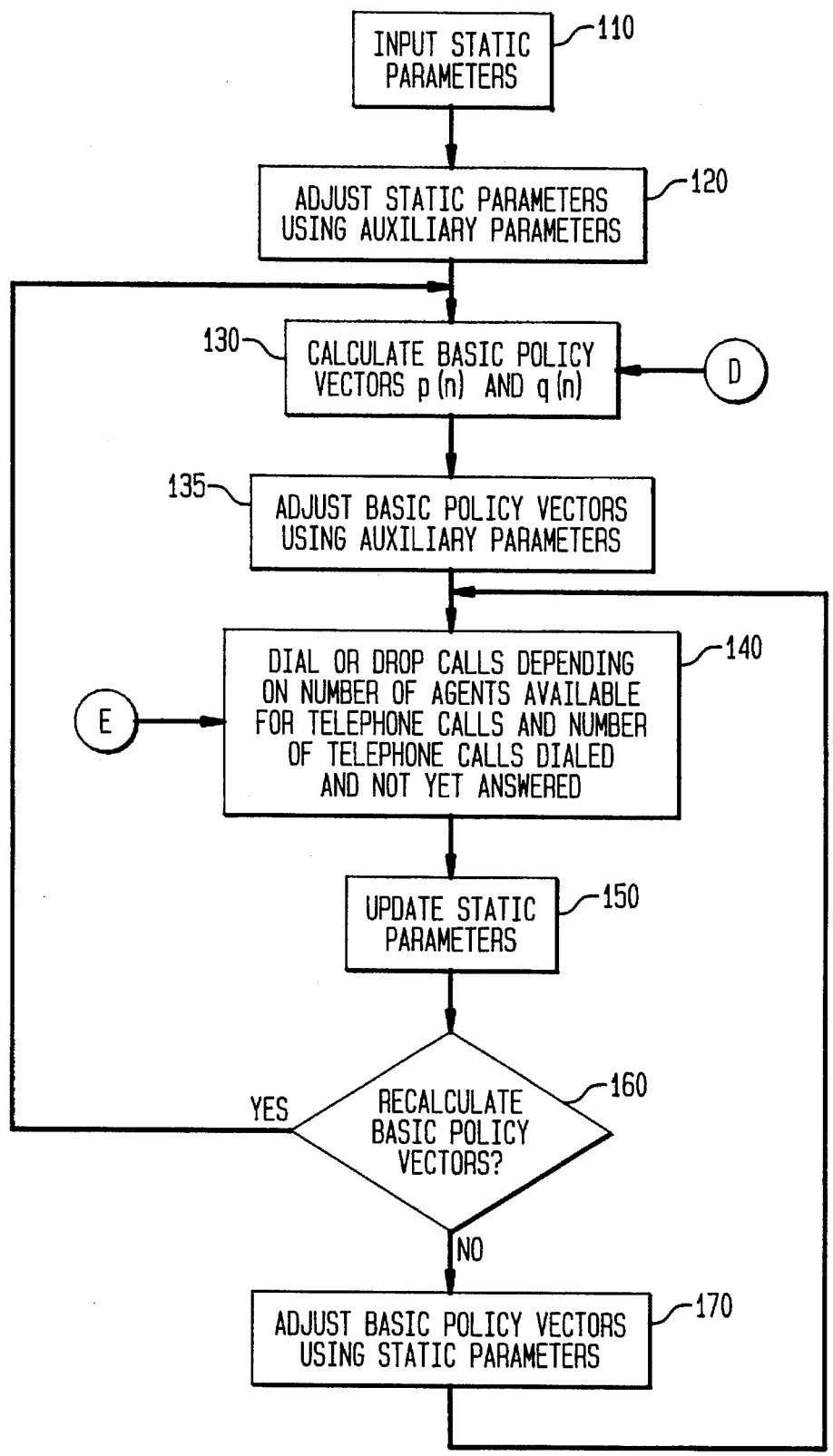
FIG. 2 shows a flow chart illustrating a general method used by embodiments of prediction apparatus 90 to determine policy vectors $p(n)$ and $q(n)$ and to determine the number of calls which should be dialed or disconnected at any time.

Embodiments of a method of operation of prediction apparatus 90 are discussed with regard to FIG. 2. Referring now to FIG. 2, the method begins in action block 110 with the input of static parameters as part of parameters 98 which are transferred from computer 40 to prediction apparatus 90. Then, control is transferred to action block 120.

At action block 120, the static parameters are adjusted using auxiliary parameters which are output by computer 40 as part of parameters 98 and which are applied as input to prediction apparatus 90. Various embodiments of the present invention contemplate that this is done as follows. If auxiliary parameter x indicates that the type of overflow mechanism 95 being used is a recording device, this implies that telephone calls are routed to a recording device when none of agents 10 are available and then back to agents 10 when they subsequently become available for telephone calls. In such a case, there is a positive feedback effect resulting from agents 10 handling telephone calls that would otherwise have been disconnected before being answered, and agents 10 who would normally have been free will take telephone calls from the recording device. Prediction apparatus 90 adjusts for this feedback effect by reducing the value of static parameter c by the value of static parameter r. Thus, c is replaced by $c/(1+r)$. As a result, the number of telephone calls determined by prediction apparatus 90 to be placed by telephone system 30 is reduced.

It should be understood that outdialing apparatus 100 is not limited to embodiments wherein overflow mechanism 95 is a recording device. In fact, it is within the scope of the present invention that other overflow mechanisms can be used for which there is a positive feedback effect that magnifies the fraction of telephone calls that overflow and, in such other embodiments, the value of static parameter c can be adjusted similarly.

Auxiliary parameter t indicates the fraction of time that agents from agents 10 should be available for telephone calls. Thus, t represents, for example, the desired limit of average agent utilization to avoid overworking agents 10. For example, a value $t=0.2$ indicates that, on average, agents 10 should be unavailable twenty percent (20%) of the time. A value of $t>0$ indicates that it is desired to apply a limit on average agent utilization, and prediction apparatus 90 adjusts for this desired agent availability by reducing the value of static parameter c by the value of auxiliary parameter t. Thus, c is replaced by $c*(1-t)$. As a result, the number of telephone calls determined by prediction apparatus 90 to be placed by telephone system 30 is reduced and agent idle time is increased. Then, control is transferred to action block 130. Transfer of control to action block 130 also occurs in the flow chart of FIG. 4 via continuation connector D, and will be discussed below.

At action block 130, basic policies p(n) and q(n) are determined. Values of p(n) represent the minimum number of telephone calls that should be placed and be awaiting an answer when n agents are available. The method used by prediction apparatus 90 for determining p(n) is described in detail below in connection with FIGS. 3a–3c. Values of q(n) represent the maximum number of telephone calls that should be dialed and be awaiting an answer when n agents are available. Further, determination of q(n) is based on the values of p(n). In embodiments of the present invention, $q(n)=p(n+1)$.

The present invention also envisions embodiments wherein determination of q(n) may be adjusted in order to increase or decrease the number of already-placed telephone calls which are disconnected before they are answered. For example, to decrease the number of such calls, prediction apparatus 90 can determine q(n) as being equal to $p(n+2)$. Then, control is transferred to action block 135.

At action block 135, the values of basic policies p(n) and q(n) are adjusted based on values of auxiliary parameters d and f provided by computer 40 and monitoring equipment 60 to prediction apparatus 90 as part of parameters 98. As the value of d becomes larger, the values of p(n) are decreased. Thus, p(n) is replaced by:

$$p(n)*max((1-d/(ns+(c-n)m)),0)$$

This reduces the minimum number of telephone calls that should be placed and awaiting an answer when n agents are available. In the event that telephone calls overflow into this group of agents 10 from another group of agents, auxiliary parameter d will reflect the rate that agents 10 become unavailable so that they may process the other group's overflow telephone calls. If the other group has c2 agents, m2 is the rate at which that group's agents become free, and r2 is the maximum allowed fraction of that group's telephone calls that may be disconnected or be routed to an overflow mechanism, then that group's telephone calls will overflow at a rate of approximately 0.9(c2m2r2). Auxiliary parameter d for the group of agents 10 that is accepting the overflow telephone calls should thus be set by computer 40 equal to 0.9(c2m2r2).

Auxiliary parameter f indicates the fraction of telephone trunks 65 for which monitoring equipment 60 cannot determine the answer status due to malfunctioning monitoring equipment 60. In the event that monitoring equipment 60 cannot determine the answer status of telephone calls due to equipment malfunctions, the telephone calls must be connected to agents 10 when the telephone calls are dialed, and fewer telephone calls can be dialed for a given number of agents 10. In this case, values of basic policy vector p(n) will be reduced by the auxiliary parameter f. Thus, p(n) is replaced by (1−f)*p(n). Then, control is transferred to action block 140. Transfer of control to action block 140 also occurs in the flow chart of FIG. 4 via continuation connector E, and will be discussed below.

At action block 140, prediction apparatus 90 determines whether additional telephone calls should be placed or whether already-placed telephone calls which have not yet been answered should be disconnected. This determination is based on the two dynamic parameters n and k. The result of the determination is output by prediction apparatus 90 as parameters 87 which are applied as input to telephone system 30. If k<p(n), prediction apparatus 90 determines that p(n)−k additional telephone calls should be placed. If k>q(n), prediction apparatus 90 determines that k−q(n) already-placed telephone calls which have not yet been answered should be disconnected.

In various embodiments contemplated by the present invention, whenever prediction apparatus 90 passes p(n)−k to telephone system 30 as parameter 87, telephone system 30 responds by placing additional telephone calls. Also, whenever prediction apparatus 90 passes −(k−q(n)) to telephone system 30 as parameter 87, telephone system 30 responds by disconnecting dialed telephone calls that are not yet answered. Further, whenever prediction apparatus 90 passes 0 to telephone system 30 as parameter 87, telephone system 30 responds by making no change to the number of telephone calls dialed. It should, of course, be understood that other schemes can be used by prediction apparatus 90 to transfer the results of its determinations to telephone system 30 as long as such schemes provide for information transfer for reporting information which enables the apparatus to distinguish three cases which represent, (1) a number of additional telephone calls that should be placed, (2) a number of already-placed telephone calls which have not yet been answered that should be disconnected, or (3) that no change is to be made. Then, control is transferred to action block 150.

At action block 150, updated values of the static parameters are received from telephone system 30 as parameters 85. Then, control is transferred to decision block 160.

Decision block 160 and action block 170 provide for deciding whether to recalculate the basic policy at decision block 160 and the step of adjusting the basic policy using static parameters at action block 170. Various embodiments of the present invention contemplate combining these steps so that efficiencies of computation can be realized and such a combined method is described in detail below in connection with FIG. 4. Thus, embodiments of prediction apparatus 90 are contemplated that can be fabricated according to the present invention wherein decision block 160 can be separated from or combined with action block 170 as long as the determinations described below are carried out.

If the basic policy needs to be redetermined, control is transferred to action block 130. However, if the basic policy does not need to be redetermined, control is transferred to action block 170.

At action block 170, the values of basic policy p(n) and q(n) are adjusted based on values of certain static parameters. The method for adjusting the basic policy based on changes to the static parameters will be described in detail below in connection with FIG. 4. Then, control is transferred to action block 140, described above.

The following describes embodiments contemplated by the present invention for determining basic policy p(n) and q(n). As will be described below, the embodiments entail first determining p(n) and then utilizing p(n) to determine q(n). In order to determine p(n), in accordance with the present invention, N(n,k) is determined, where N(n,k) is the average number of telephone calls which are overflowed until the next call is placed, assuming n free agents and k calls in setup state. To attain predetermined performance objective r, prediction apparatus 90 determines policy vector p(n) such that N(n,p(n))=r for each value of n. However, if r=0, this will not be realizable. Therefore, one chooses a positive lower bound for r. It is envisioned that a reasonable value for this lower bound is 0.005, i.e., r cannot be less than 0.005.

There are three other properties of p(n) that are required for attaining the predetermined performance objective. First, in light of the fact that it is desirable that the apparatus place at least as many telephone calls as there are available agents among agents 10, i.e., it is desirable to have at least as many calls in setup state as there are idle agents, $p(n) \geq n$ for n=0, 1 . . . , c—where c is the total number of agents among agents 10 who are either handling a telephone call or are available for handling a telephone call. Second, in light of the fact that it is desirable that the number of telephone calls which have been placed by the apparatus be larger when the number of agents among agents 10 that are available to handle such calls is larger, $p(n+1) \geq p(n)$ for n=0, 1, . . . , c−1. Third, in light of the fact that the total number of agents among agents 10 is c, the maximum number of already-placed telephone calls which have not yet been answered, i.e, calls in the setup phase, K, is p(c). In practice, K will not be known until the policy is determined, however, the determination of the policy depends on having N(n,k) defined. Thus, a reasonable value to utilize for K in setting up N, is 3 c/p. Only entries in N(n,k) up to k=K, whatever that turns out to be, will actually be used.

In light of the above, values of N(n,k) are defined for a region defined by $0 \leq n \leq c$ and $0 \leq k \leq K$. In accordance with the present invention, the values N(n,k) are recursively defined by four equations shown below as E1, E2, E3 and E4.

For $k \leq n$ or k<p(n), or equivalently where $k \leq \max(n, p(n)-1)$:

$$N(n,k) = 0 \tag{E1}$$

For $k \geq p(0)$ and $k \leq K$, have:

$$N(0,k) = (cmN(1,k) + ks(p + N(0,k-1)))/(cm + ks) \tag{E2}$$

For (c,K):

$$N(c,K) = pN(c-1, K-1) \tag{E3}$$

For $0 < n < c, k \geq p(n)$ and $k \leq K$, have:

-continued $$N(n,k) = \frac{((c-n)mN(n+1,k) + ks\,(pN(n-1,k-1) + (1-p)N(n,k-1)))}{(c-n)m + ks} \quad (E4)$$

As will be apparent to those of ordinary skill in the art, exactly one of equations E1, E2, E3 and E4 applies for each combination of n and k.

The determination of N(n,k) depends on the policy and vice versa. One can iterate between determinations of p(n) and N(n,k) or determine p(n) and N(n,k) at the same time.

Figure 3A:
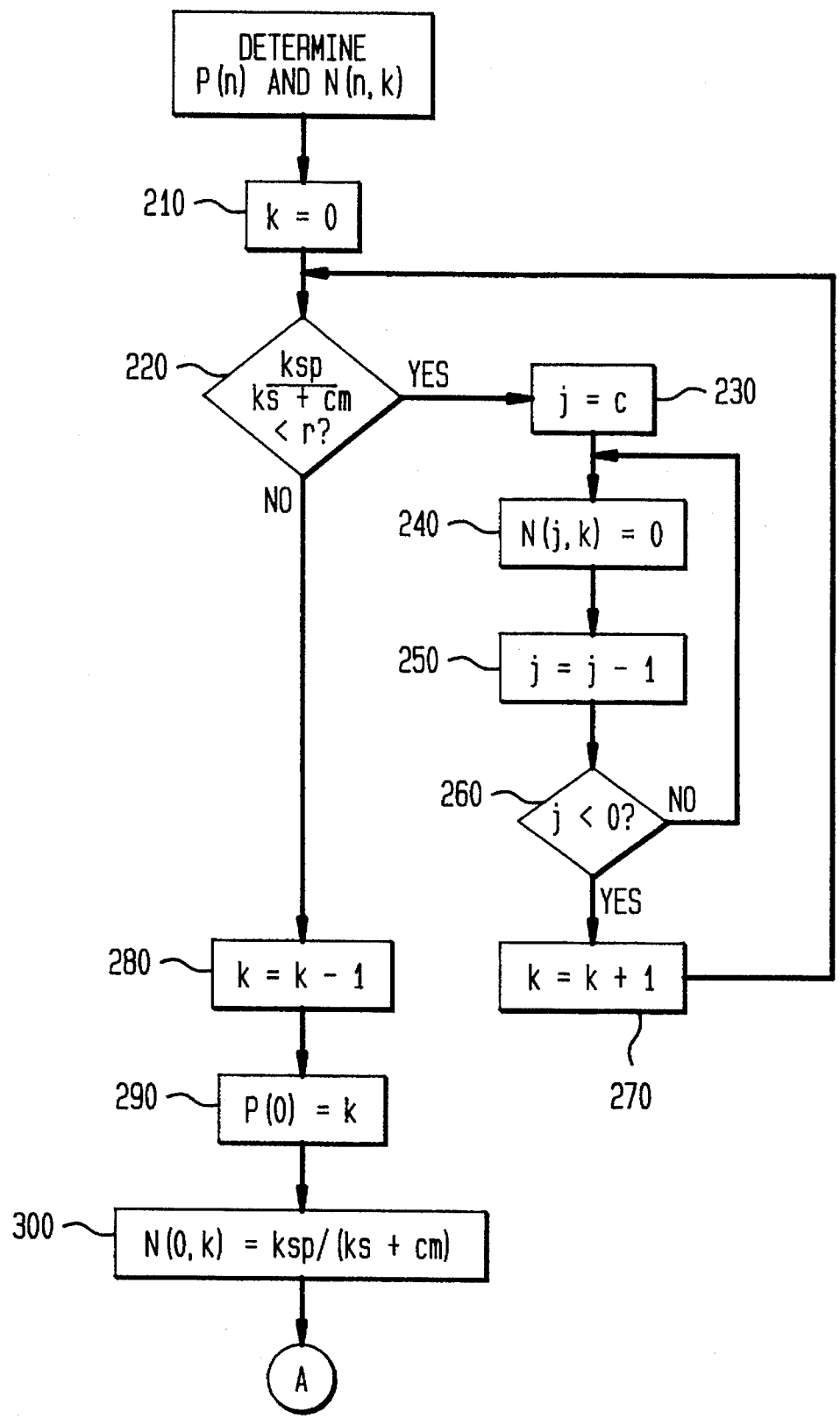
FIGS. 3a–3c show a flow chart illustrating in greater detail than FIG. 2 the predictive dialing method used by embodiments of prediction apparatus 90 to calculate basic policy vector p(n) and matrix N(n,k)
Figure 3B:
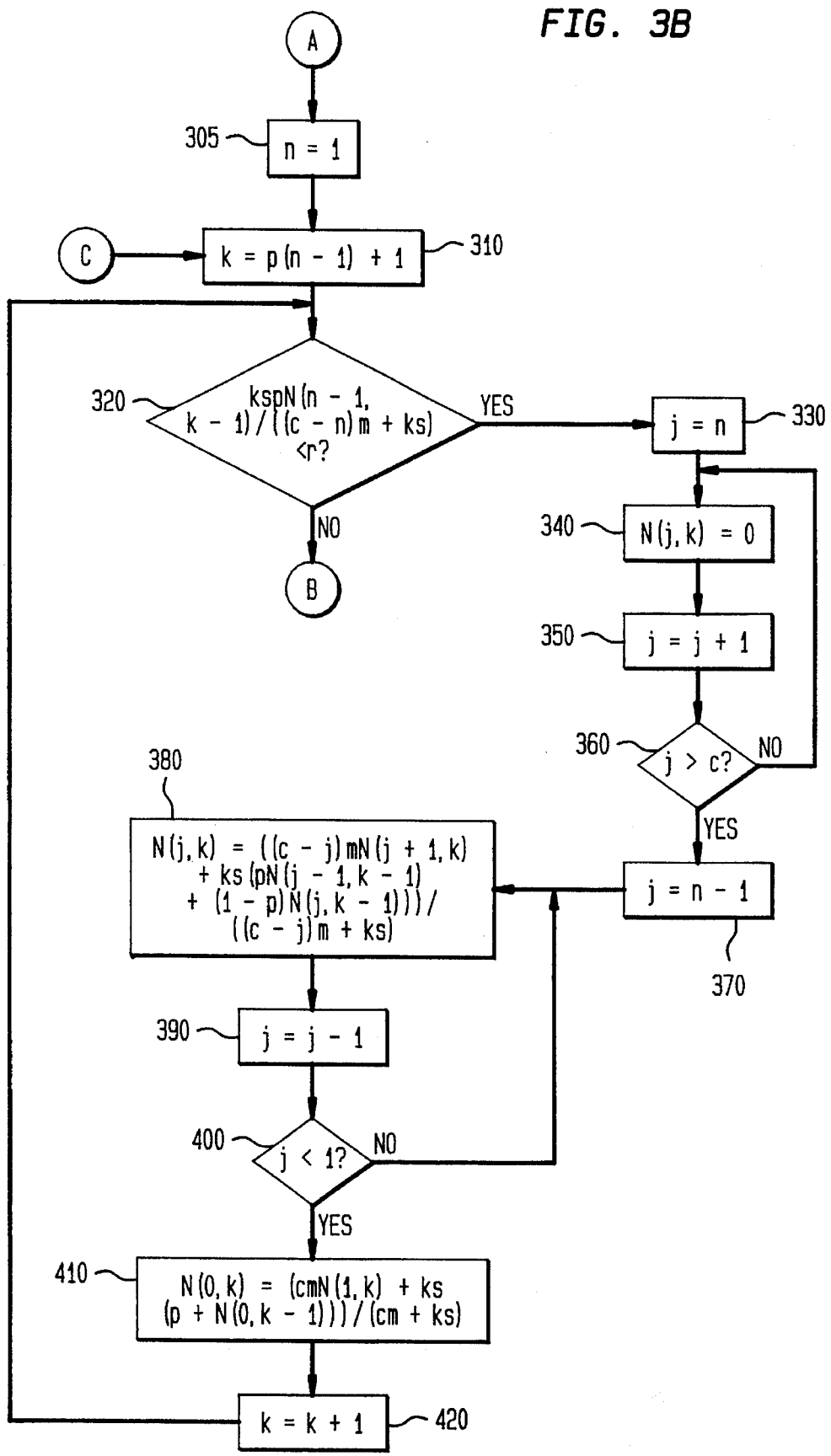
Figure 3C:
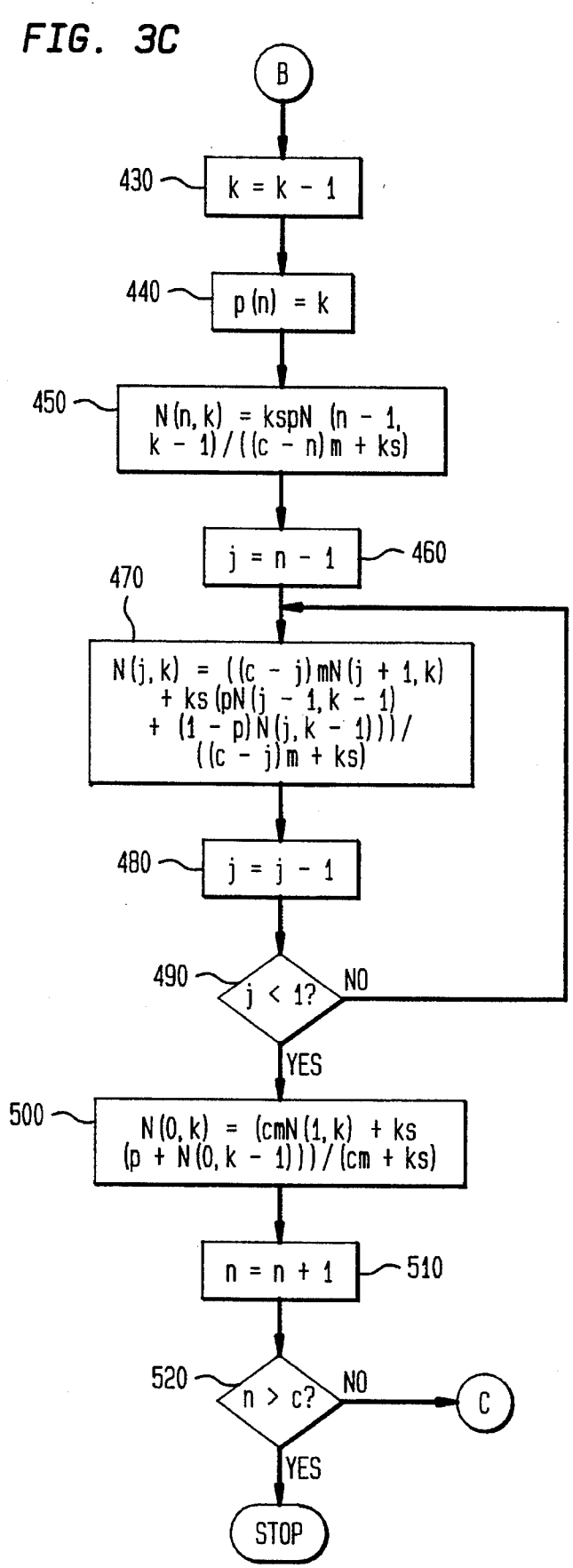

FIGS. 3a–3c show a flow chart illustrating a method contemplated by embodiments of the present invention to determine basic policy p(n) and matrix N(n,k) at the same time. Referring first to FIG. 3a, blocks 210 through 300 determine N(j,k) for $0 \leq j \leq c$ and $0 \leq k \leq p(0)$. Trial values of N(j,p(0)) are determined for $0 \leq j \leq c$ and the value of p(0) is determined. p(0) is the largest k such that ksp/(ks+cm)<r. This will typically be 0. Since ksp/(ks+cm) increases as k increases, p(O) is determined by testing ascending values of k.

At action block 210, variable k is set to 0. Then, control is transferred to decision block 220.

At decision block 220, a determination made as to whether or not ksp/(ks+cm)<r. This condition is satisfied by k=p(0), so that k=p(0)+1 when ksp/(ks+cm)≥r. If ksp/(ks+cm)<r, control is transferred to action block 230, otherwise control is transferred to action block 280.

At action block 230, variable j is set to c. Then, control is transferred to action block 240.

At action block 240, N(j,k) is set to 0. Since p(j)≥p(0)>k and N(j,k)=0 when k<p(j), N(j,k) is assigned a trial value-of 0. Then, control is transferred to action block 250. It should be noted that if prediction apparatus 90 subsequently determines that p(0)>k, these trial values of N(j,k) are the final values. Otherwise, if prediction apparatus 90 subsequently determines that p(0)=k, the correct value for N(0,k) will be assigned at action block 300 and correct values for N(j,k) where j>0 will be assigned in blocks 310 through 500.

At action block 250, j is decremented by 1. Then, control is transferred to decision block 260.

At decision block 260, a determination is made as to whether or not j is less than 0. If so, control is transferred to action block 240, otherwise control is transferred to action block 270.

At action block 270, k is incremented by 1. Then, control is transferred to decision block 220.

Action block 280 is reached after it has been determined in decision block 220 that ksp/(ks+cm) is not <r. At action block 280, k is decremented by 1. Then, control is transferred to action block 290.

At action block 290, p(0) is set to k. Then, control is then transferred to action block 300.

Blocks 300 through 520 in FIGS. 3a–3c comprise a method for determining p(n) for $1 \leq n \leq c$, and the remaining N(j,k). It should be noted that p(n) is the largest k such that kspN(n−1,k−1)/((c−n)m+ks)<r. Since, the expression kspN(n−1,k−1)/((c−n)m+ks) increases with increasing k, the values of p(n) are tested in increasing order of k.

At action block 300, N(0,k) is set to ksp/(ks+cm). Then, control is transferred to action block 305, as shown by continuation connector A in FIGS. 3a and 3b.

Referring next to FIG. 3b, at action block 305, n is set to 1. Then, control is transferred to action block 310.

At action block 310, k is set to p(n−1)+1. Then, control is transferred to decision block 320.

At decision block 320, a determination is made as to whether or not kspN(n−1,k−1)/((c−n)m+ks) is less than r. If so, control is transferred to action block 330, otherwise control is transferred to action block 430, as shown by continuation connector B in FIGS 3b and 3c. It should be noted that if kspN(n−1,k−1)/((c−n)m+ks)<r then p(n)≥k, and otherwise p(n)=k−1.

At action block 330, j is set to n. Then, control is transferred to action block 340.

At action block 340, N(j,k) is set to 0. Since p(j)≥p(n)>k when j≥n and N(j,k)=0 when k<p(j), N(j,k) is assigned a trial value of 0. Then, control is transferred to action block 350.

At action block 350, j is incremented by 1. Then, control is then transferred to decision block 360.

At decision block 360, a determination is made as to whether or not j is greater than c. If j≤c, control is transferred to action block 340 described earlier, otherwise control is transferred to action block 370.

Blocks 370 through 420 determine values of N(j,k) for j>0. It should be understood that values of N(j,k) are calculated for decreasing values of j because N(j,k) depends on N(j+1,k). Values of N(j,k) for j>0 are determined at action block 380 according to one method, and values of N(0,k) are determined separately at action block 410 according to a different method.

At action block 370, j is set to n−1. Then, control is transferred to action block 380.

At action block 380, N(j,k) is set to: ((c−j)mN(j+1,k)+ks(pN(j−1,k−1)+(1−p)N(j,k−1)))/((c−j)m+ks) Then, control is transferred to action block 390.

At action block 390, j is decremented by 1. Then, control is transferred to decision block 400.

At decision block 400, a determination is made as to whether or not j is less than 1. If j≥1, control is transferred to action block 380 described earlier, otherwise control is transferred to action block 410.

At action block 410, N(0,k) is set to (cmN(1,k)+ks(p+N(0,k−1)))/(cm+ks). Then, control is transferred to action block 420.

At action block 420, k is incremented by 1. Then, control is transferred to decision block 320, described earlier.

Action block 430 in FIG. 3c is reached after it is determined in decision block 320 (FIG. 3b) that kspN(n−1,k−1)/((c−n)m+ks)≥r. At this point, k is one larger than p(n). At action block 430, k is decremented by 1. Then, control is transferred to action block 440.

At action block 440, p(n) is set to k. Then, control is transferred to action block 450.

At action block 450, N(n,k) is set to kspN(n−1,k−1)/((c−n)m+ks). Then, control is transferred to action block 460.

Blocks 460 through 500 determine values of N(j,k) for n>j≥0. It should be noted that values of N(j,k) are determined for decreasing values of j because N(j,k) depends on N(j+1,k). Values of N(j,k) for j>1 are determined at action block 470 according to one method, and the value of N(0,k) is determined separately at action block 500 according to a different method.

At action block 460, j is set to n−1. Then, control is transferred to action block 470.

At action block 470, N(j,k) is set to ((c−j)mN(j+1,k)+ks(pN(j−1,k−1)+(1−p)N(j,k−1)))/((c−j)m+ks). Then, control is transferred to action block 480.

At action block 480, j is decremented by 1. Then, control is transferred to decision block 490.

At decision block 490, a determination is made as to whether or not j is less than 1. If j≥1, control is transferred to action block 470 described above, otherwise control is transferred to action block 500.

At action block 500, N(0,k) is set to (cmN(1,k)+ks(p+ N(0,k−1)))/(cm+ks). Then, control is transferred to action block 510.

At action block 510, n is incremented by 1. Then, control is transferred to decision block 520.

At decision block 520, a determination is made as to whether or not n is greater than c. If n≦c, control is transferred to action block 310 described above via continuation connector C shown in FIGS. 3b and 3c, otherwise the determination of p(n) is complete.

Of course, it should be understood that the above-stated method described with regard to FIGS. 3a–3c is only by way of example, and that the present invention contemplates various other techniques for determining basic policy p(n) and matrix N(n,k).

The remainder of the basic policy determination is the determination of q(n). As set forth above, q(n) determines when the apparatus will disconnect from calls in an effort to avoid all agents being busy when a call is answered. This part of the policy is set based on user input describing the level of aversion the user has to this procedure, for example, the maximum allowable fraction of disconnected calls. Setting q(n) equal to p(n+1) or p(n+2), for example, achieves a moderate or small, respectively, number of disconnected calls.

As stated above, the basic policy is a function of the five static parameters: average talk plus work time (1/m); average call setup time (1/s); number of agents working (c); probability that a call is answered (p); and maximum allowed overflow fraction (r). If the value of any of the five static parameters changes significantly, then the basic policy must be redetermined. For minor changes in these values, the basic policy can be adjusted using static parameters. Thus, in the case of minor changes, a run-time modification to the basic policy is made based on the dynamic value of the first four of the static parameters set forth above. In accordance with embodiments contemplated by the present invention, the maximum allowed fraction of overflow is a parameter which should be changed infrequently and a change to r should require a new policy determination.

Figure 4:
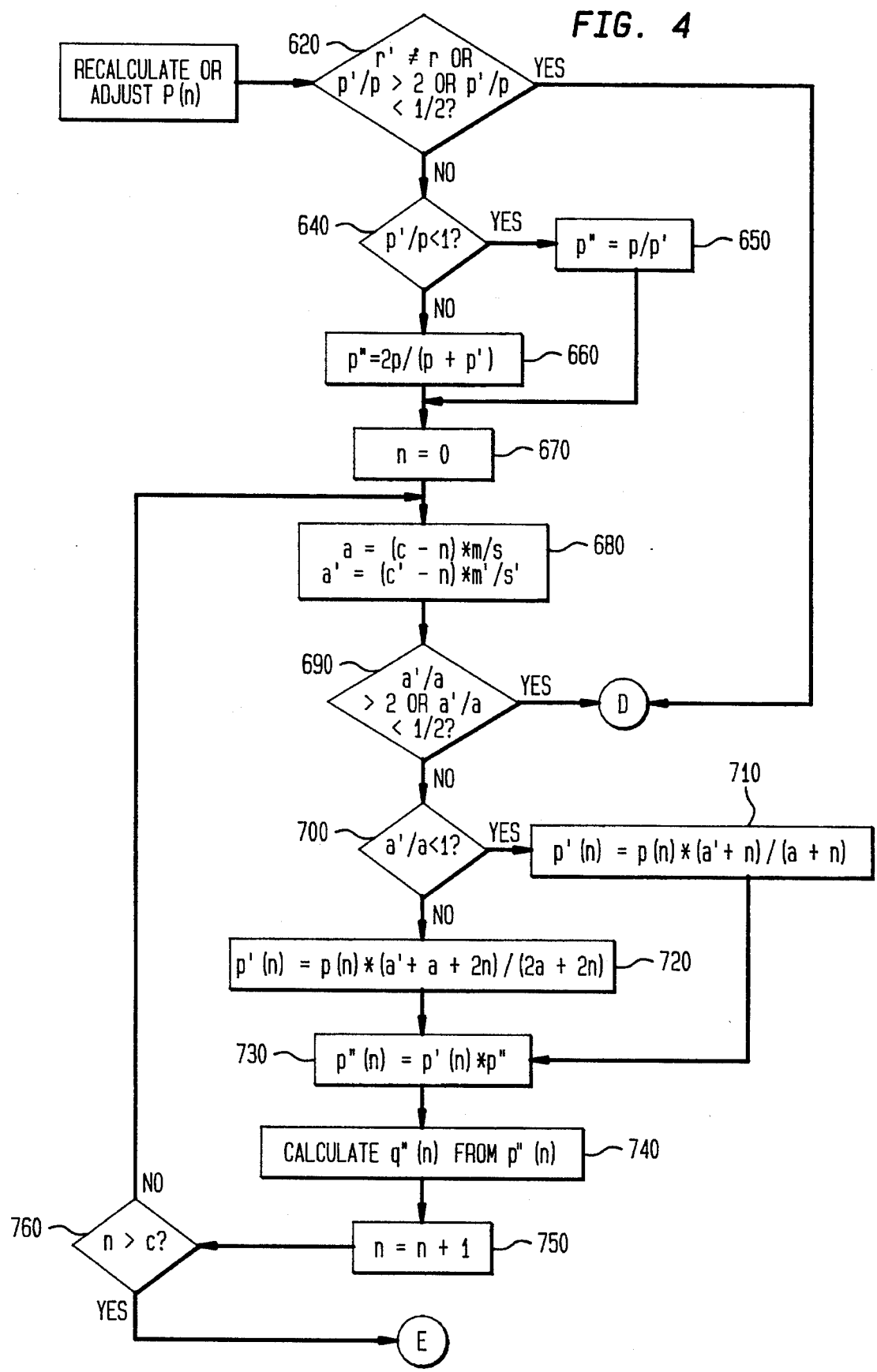
FIG. 4 shows a flow chart illustrating the method used by embodiments of prediction apparatus 90 to determine whether the basic policy vector p(n) should be recalculated, and the method for that recalculation, whenever there are changes to parameters 98 originally applied as input to prediction apparatus 90.

FIG. 4 shows a flow chart illustrating a method contemplated by embodiments of the present invention to determine whether the basic policy p(n) should be recalculated, and if not, the method for the adjustment to the basic policy p(n), whenever there are changes to parameters 98 originally applied as input to prediction apparatus 90. In the following description, m', s', c', p' and r' are new values of the static parameters m, s, c, p and r, respectively.

Referring now to FIG. 4, at decision block 620, a determination is made as to whether or not: (1) r is not equal to r', or (2) p'/p is greater than 2, or (5) p'/p is less than ½. If any of these conditions are true, then control is transferred to action block 130 of FIG. 2, via continuation connector D as shown in FIGS. 2 and 4 (and, thus, basic policy p(n) and q(n) are calculated as described above in connection with FIGS. 3a–3c), otherwise control is transferred to decision block 640.

At decision block 640, a determination is made as to whether or not p'/p is less than 1. If p'/p<1, control is transferred to action block 650, otherwise control is transferred to action block 660.

At action block 650, variable p" is set to p/p', while at action block 660, variable p" is set to 2 p/(p+p'). In both cases, control is then transferred to action block 670.

At action block 670, variable n is set to 0, and control is transferred to action block 680.

At action block 680, variable a is set to (c−n)*m/s, and variable a' is set to (c'−n)*m'/s'. Then, control is transferred to decision block 690.

At decision block 690, a determination is made as to whether a'/a>2 or a'/a<½. If either condition is true, then control is transferred to action block 130 of FIG. 2, as shown by continuation connector D (FIGS. 2 and 4). Otherwise, control is transferred to decision block 700.

At decision block 700, a determination is made as to whether or not a'/a<1. If a'/a<1, control is transferred to action block 710. Otherwise, control is transferred to action block 720.

At action block 710, vector p'(n) is set to p(n)*(a'+n)/(a+n), whereas at action block 720, vector p'(n) is set to p(n)=p(n)*(a'+a+2n)/(2a+2n). In both cases, control is transferred to action block 730.

At action block 730, vector p"(n) is set to p'(n)*p", and control is transferred to action block 740.

At action block 740, vector q"(n) is determined based on values of vector p"(n). In embodiments contemplated by the present invention, q"(n)=p"(n+1). It should be understood that the determination of q"(n) may be adjusted to increase or decrease the number of dialed telephone calls that are disconnected before they are answered. For example, to decrease the number of such calls, one can determine q"(n) as follows: q"(n)=p"(n+2). Control is then transferred to action block 750.

At action block 750 variable n is set to n+1, and control is transferred to decision block 760.

At decision block 760, a determination is made as to whether n>c. If true, the adjustment of the basic policy is complete, the values of p"(n) replace p(n) and the values of q"(n) replace q(n) in the remainder of the prediction method, and control is then transferred to action block 140 of FIG. 2, as shown by continuation connector E. If false, control is transferred to action block 680, where processing proceeds in the above-described manner.

Figure 5:
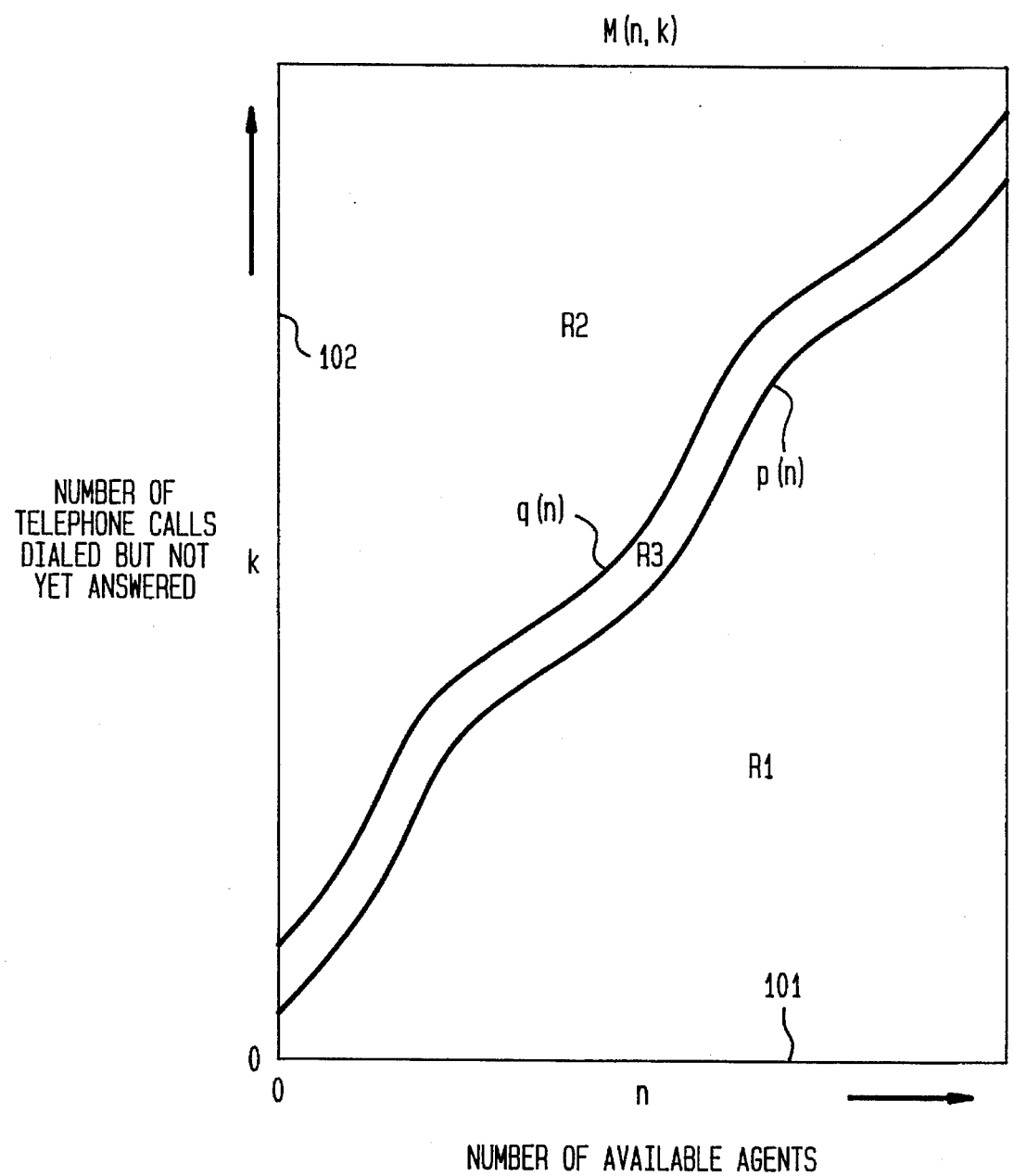
FIG. 5 shows a graph illustrating the use of a policy p(n) to determine whether additional telephone calls should be placed and the use of a policy q(n) to determine whether telephone calls that are placed but which have not yet been answered should be disconnected.

FIG. 5 is a graph for providing a further explanation of the prediction techniques contemplated by embodiments of the present invention.

Referring now to FIG. 5, this graph illustrates the use policy vector p(n) and policy vector q(n). Horizontal axis 101 represents n, the number of available agents, and vertical axis 102 represents k, the number of already-placed telephone calls which have not yet been answered. A point (n,k) in FIG. 5 would have a value M(n,k). Depending on whether this point is located in region R1, R2 or R3 of the graph, M(n,k) represents either the number of additional telephone calls that should be placed, or the number of already-placed telephone calls that should be disconnected before they are answered, or that the status quo is to be preserved.

In FIG. 5, region R1 of the graph represents instances where prediction apparatus 90 has determined that there are sufficient ones of agents 10 which are available to respond to telephone calls as they are answered. As one can see from FIG. 5, region R1 is bounded at the top by policy vector p(n). Policy vector p(n) represents points on FIG. 5 which specify the minimum number of telephone calls that should be placed and be awaiting an answer whenever n agents are available. Thus, whenever k telephone calls are placed and k is less than p(n), in accordance the present invention and as illustrated in FIG. 5, prediction apparatus 90 outputs one of parameters 87 to indicate that M(n,k)=p(n)−k more telephone calls may be placed by outdialing apparatus 100 and still have outdialing apparatus 100 meet its predetermined performance objective r which represents the maximum allowed fraction of telephone calls that telephone system 30 may route to overflow mechanism 95.

Note that the case where r=0 is the equivalent of preview dialing schemes available in conventional systems wherein a telephone call is placed if and only if one or more of agents 10 are available to handle the telephone call. However, it is important to recognize that the case of r>0 requires that some telephone calls may be routed to overflow mechanism 95 after they are answered. For example, a value of r=0.01 indicates a design objective for the outdialing apparatus wherein a maximum of one percent (1.0%) of placed telephone calls should be routed to overflow mechanism 95 after they are answered. Note that, in accordance with the preferred embodiment of the present invention, M(n,k)>0 within region R1.

Region R2 of the graph represents instances where prediction apparatus 90 has determined that there are not enough agents in agents 10 which are available to respond to telephone calls as they are answered. As one can see from FIG. 5, region R2 is bounded at the bottom by policy vector q(n). Policy vector q(n) represents points on FIG. 5 which specify the maximum number of telephone calls that should be placed and awaiting answer—whenever n agents are available. Thus, whenever k telephone calls are placed and k is greater than q(n), in accordance the present invention and as illustrated in FIG. 5, prediction apparatus 90 outputs one of parameters 87 to indicate that M(n,k)=q(n)−k, so k−q(n) already-placed telephone calls ought to be disconnected before they are answered in order that outdialing apparatus 100 is able to meet its predetermined performance objective r. Note that, in accordance with the preferred embodiment of the present invention, M(n,k)<0 within region R2.

Region R3 of the graph, i.e., the area between policy vectors p(n) and q(n), represents situations where prediction apparatus 90 determines that the probability of telephone calls being routed to overflow mechanism 95 is sufficiently low that no change need be made to the operation of telephone system 30 and outdialing apparatus 100 will meet its predetermined performance objective. Note that, in accordance with the preferred embodiment of the present invention, M(n,k)=0 within region R3.

Figure 6:
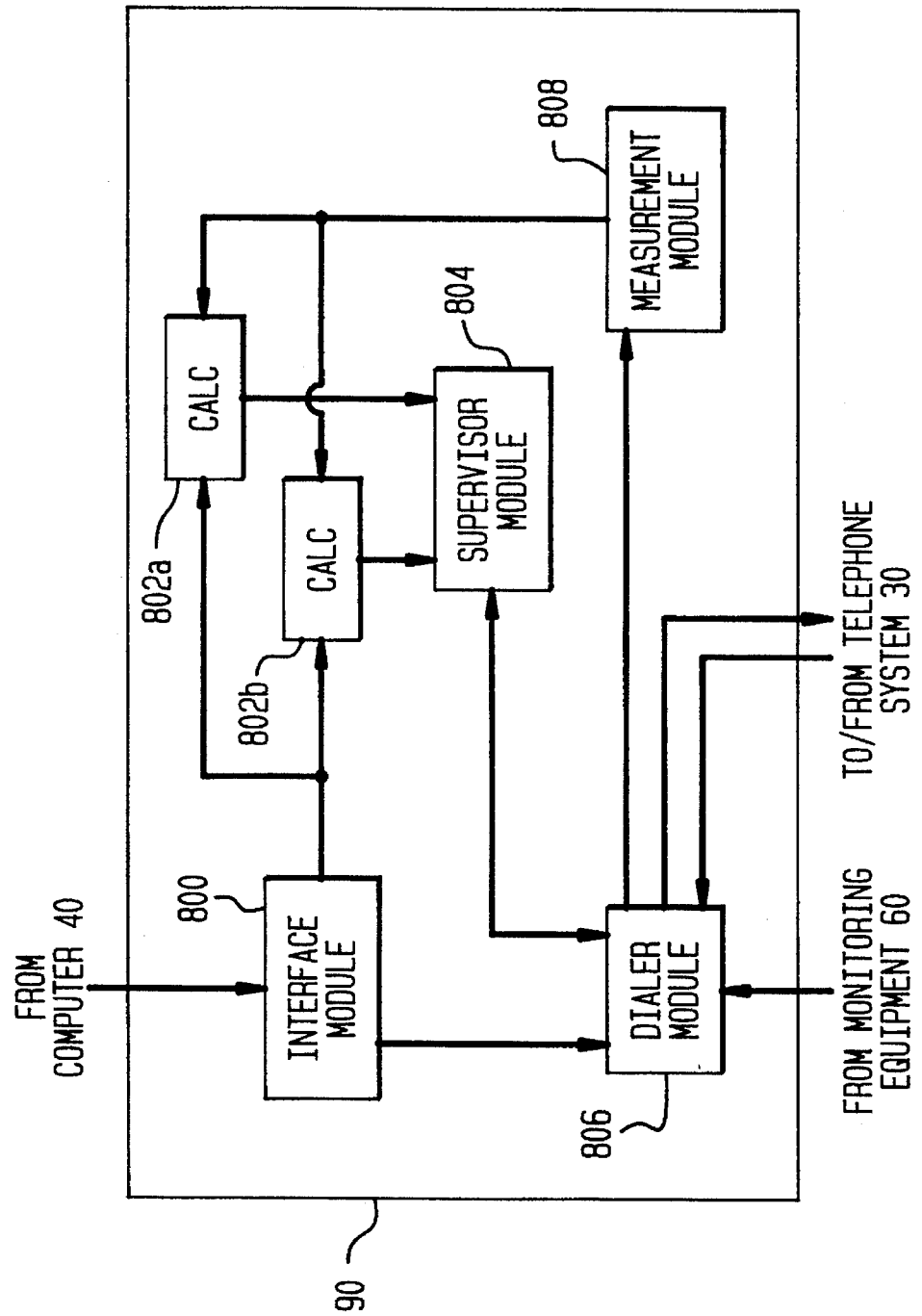
FIG. 6 shows a block diagram of the modules of prediction apparatus 90 as contemplated by embodiments of the present invention.

The modules comprising prediction apparatus 90 as contemplated by embodiments of the present invention are now discussed with regard to FIG. 6. Referring to FIG. 6, an interface module 800 receives telephone numbers, static parameters and auxiliary parameters from computer 40.

Each of the calculation modules 802a and 802b receives the static and auxiliary parameters from interface module 800, and uses them to compute and to update policy vectors p(n) and q(n), respectively. Also for this purpose, a measurement module 808 calculates the current values of c', s', m' and p', and forwards them to calculation modules 802a and 802b.

A supervisor module 804 receives the policy vectors from the calculation modules 802a and 802b, and from this, decides when additional calls should be initiated, and when initiated but unanswered calls should be disconnected.

A dialer module 806 receives the information from supervisor module 804 concerning when to initiate or disconnect a call. The dialer module 806 also receives the telephone numbers from interface module 800. Thus, when dialer module 806 receives an instruction to initiate more calls, it forwards the appropriate number of telephone numbers to telephone system 30, so that those numbers can be dialed. If, however, instructions are received to disconnect initiated calls, then dialer module 806 forwards that instruction (with the appropriate number of calls to disconnect) to telephone system 30.

Dialer module 806 also receives signals indicating the progress of initiated calls. These signals come from monitoring equipment 60. In addition, the various parameters 85 discussed above are also received by the dialer module 806. Statistics concerning these inputs are forwarded to measurement module 808, from which the current values of c', s', m', and p' are calculated.

Of course, it should be understood that the present invention contemplates other embodiments having, e.g., a different configuration of modules from that described above with regard to FIG. 6.

It should be understood that the present invention is not limited to use with conventional telephone systems, and can also be applied to video-phone systems, computer networks, or any type of future communications system. In addition, the target entities to which the agents' calls are directed are not limited to "customers" or even other persons, and can thus be machines.

It should also be emphasized that the various components of embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention.

It is to be appreciated and understood that the specific embodiments of the invention described hereinbefore are merely illustrative of the general principles of the invention. Various modifications may be made by those skilled in the art consistent with the principles set forth hereinbefore.

What is claimed is:

1. A method for controlling the number of communications in a setup phase to target entities, wherein the communications in a setup phase are unanswered communications initiated by a communication system to target entities ahead of the availability of one of a plurality of agents, the method comprising the steps of:

(a) determining a current value n that is representative of the number of agents that are available;

(b) based upon said current value n, determining a minimum number of communications to be in a setup phase;

(c) based upon said current value n, determining a maximum number of communications permitted to be in a setup phase;

(d) determining the number of communications that are in a setup phase;

(e) initiating an additional communication if the number of communications that are in a setup phase is less than said determined minimum number of communications, and repeating said initiating until the number of communications that are in a setup phase is at least equal to said determined minimum number of communications; and (f) disconnecting one communication that is in a setup phase if the number of communications that are in a setup phase is greater than said determined maximum number of communications, and repeating said disconnecting until the number of communications that are in a setup phase is at most equal to said determined maximum number of communications;

(g) repeating said steps (a) through (f).

2. The method of claim 1, wherein said step (c) further includes defining a temporary minimum number of communications as one plus the value n (n+1) and basing said maximum number on said temporary minimum number of communications.

3. The method of claim 1, wherein said step (b) comprises an additional substep of adjusting said minimum number of communications based upon a rate at which initiated communications are either answered or disconnected because said initiated communications have not been answered within a predetermined amount of time.

4. The method of claim 1, wherein said step (b) comprises an additional substep of adjusting said minimum number of communications based upon a computed probability that an initiated communication will be answered.

5. The method of claim 1, wherein said step (b) comprises an additional substep of adjusting said minimum number of communications if a parameter indicates that a recording device is being used as an overflow mechanism.

6. The method of claim 1, wherein said step (b) comprises an additional substep of adjusting said minimum of communications based upon a fraction of communications for which an answer status cannot be determined due to malfunctioning equipment.

7. The method of claim 1, further comprising the step of detecting when one of the initiated communications has been responded to by one of the target entities, and connecting said one of the target entities with one of said available agents.

8. The method of claim 7, wherein said step (b) comprises an additional step of adjusting said minimum number of communications based upon the number of said available agents and the number of agents who are connected with one of the target entities.

9. The method of claim 7, wherein said step (b) further comprises an additional substep of adjusting said minimum number of communications based upon a rate at which agents become available.

10. The method of claim 7, wherein said step (b) comprises an additional substep of adjusting said minimum number of communications if a parameter indicates that a second group of agents can receive overflow communications.

11. The method of claim 7, wherein said step (b) comprises an additional substep of adjusting said minimum number of communications based upon a rate at which agents will be unavailable for receiving communications.

12. The method of claim 7, wherein said step (b) comprises an additional substep of adjusting said minimum number of communications based upon a desired limit of average agent utilization.

13. A system for providing a communication path between each of a plurality of agents and a target entity by predicting the availability of said plurality of agents and initiating a plurality of communications between a communications network and a plurality of target entities ahead of the availability of said plurality of agents, comprising:

availability means for monitoring the number of available agents;

minimum determination means, responsive to said availability means, for determining a minimum number of calls which must be placed in a setup state, thereby establishing a minimum number of required initiated communications;

maximum determination means, responsive to said availability means, for determining a maximum number of calls permitted to be in a setup state, thereby establishing a maximum number of permitted initiated communications;

call monitoring means coupled to said communication network for determining the current number of calls that are in a setup state;

connection determination means for determining, in response to said minimum and said maximum determination means and to said call monitoring means, a number of additional communications to be initiated, thereby having at least said minimum number of required initiated communications, and for determining a number of already initiated but unanswered communications to be disconnected, thereby having at most said maximum number of permitted initiated communications; and means, coupled to said communications network and to said connection determination means, for initiating said number of additional communications and for disconnecting said number of already initiated but unanswered communications;

whereby the number of communications in a setup state is at least equal to said minimum number of required initiated communications and is at most equal to said maximum number of permitted initiated communications.

14. The system of claim 13, wherein said minimum determination means comprises rate monitor means for providing a rate at which said plurality of initiated communications are either answered or disconnected because they have not been answered within a predetermined amount of time, said minimum number of calls which must be placed in a setup state being based upon said rate provided by said rate monitor means.

15. The system of claim 13, wherein said minimum determination means comprises probability means for determining a probability that one of said plurality of initiated communications will be answered, said minimum number of calls which must be placed in a setup state being based upon said probability.

16. The system of claim 13, wherein said minimum determination means comprises means for indicating that one of a recording device and a second group of agents serves as an overflow mechanism.

17. The system of claim 13, wherein said minimum number of calls which must be placed in a setup state is based upon a fraction of said plurality of initiated communications for which an answer status cannot be determined due to malfunctioning equipment.

18. The system of claim 13, wherein a second minimum number of calls which must be placed in a setup state is provided by said minimum determination means based upon a number equal to the sum of said number of available agents plus at least one, and said maximum number of calls permitted to be in a setup state is equal to said second minimum number.

19. The system of claim 13, further comprising means for detecting when one of said plurality of initiated communications has been responded to by a target entity, thereby establishing an answered call, and connecting said answered call to an available agent.

20. The system of claim 19, wherein said minimum determination means comprises rate monitor means for providing a rate at which agents become available, said minimum number of calls which must be placed in a setup state being based upon said rate provided by said rate monitor means.

21. The system of claim 19, wherein said minimum determination means comprises rate monitor means for providing a rate at which agents will be unavailable for connection to an answered call, said minimum number of calls which must be placed in a setup state being based upon said rate provided by said rate monitor means.

22. The system of claim 19, wherein said minimum determination means comprises means for indicating a desired limit of average agent utilization, said minimum number of calls which must be placed in a setup state being based upon said desired limit.

23. The system of claim 19, wherein said maximum number of calls permitted to be in a setup state is based upon the number of agents who are available and who are communicating with target entities.

24. A telephone system for allowing a plurality of agents to contact a plurality of target entities, wherein the availability of the agents is predicted and wherein telephone calls to target entities are initiated ahead of the availability of the agents, comprising:

database means for storing the telephone numbers of the plurality of target entities;

monitoring means, for monitoring the status of each initiated telephone call;

prediction means, responsive to said monitoring means and to parameters relating to the agents, for predicting when additional telephone calls should be initiated, and when initiated but unanswered telephone calls should be disconnected, including means for determining, based upon the availability of the agents, a minimum limit representing the minimum number of calls which must be placed in a setup state, thereby establishing a minimum number of required initiated calls and further including means for determining, based upon the availability of the agents, a maximum limit representing the maximum number of calls permitted to be in a setup state, thereby establishing a maximum number of permitted initiated calls;

telephone switching means, responsive to said prediction means, for initiating additional telephone calls using said telephone numbers from said database means, for disconnecting initiated unanswered telephone calls, and for connecting one of the agents with a telephone call answered by a target entity.

25. The telephone system of claim 24, wherein said prediction means further comprises:

connection determination means for determining, in response to said means for determining said minimum and said maximum limits, a number of additional telephone calls to be initiated, thereby ensuring that the number of calls in a setup state is equal to at least said minimum number of required initiated calls, and for determining a number of already initiated but unanswered telephone calls to be disconnected, thereby ensuring that the number of calls in a setup state is equal to at most said maximum number of permitted initiated calls; and wherein said telephone switching means is coupled to said connection determination means, thereby initiating additional calls and disconnecting initiated unanswered calls in response to said connection determination means.

26. The system of claim 25, wherein said minimum limit further is based upon a rate at which the initiated telephone calls are either answered or disconnected because they have not been answered within a predetermined amount of time.

27. The system of claim 25, wherein said minimum limit further is based upon a computed probability that an initiated telephone call will be answered.

28. The system of claim 25, wherein said means for determining said minimum limit comprises means for indicating that one of a recording device and a second group of agents serves as an overflow mechanism.

29. The system of claim 25, wherein said minimum limit further is based upon a parameter indicating a fraction of telephone calls for which an answer status cannot be determined due to malfunctioning equipment.

30. The system of claim 25, wherein said maximum limit is equal to a second minimum limit, said second minimum limit being provided by said means for determining a minimum limit based upon the sum of said number of available agents plus at least one.

31. The system of claim 25, further comprising means for detecting when one of said plurality of initiated calls has been responded to by one of the target entities, and connecting said one of the target entities with one of the agents.

32. The system of claim 31, wherein said maximum limit further is based upon the number of the plurality of agents who are connected with a target entity and who are available to be connected to a target entity.

33. The system of claim 31, wherein said minimum limit further is based upon a rate at which the agents become available.

34. The system of claim 31, wherein said minimum limit further is based upon a parameter indicating a rate at which agents will be unavailable for connection to an answered call.

35. The system of claim 31, wherein said minimum limit further is based upon a parameter indicating a desired limit of average agent utilization.

* * * * *